United States Patent [19]

Croll

[11] Patent Number: 5,367,688
[45] Date of Patent: Nov. 22, 1994

[54] BOOT SYSTEM FOR DISTRIBUTED DIGITAL DATA PROCESSING SYSTEM

[75] Inventor: John Croll, Acton, Mass.

[73] Assignee: Digital Equipment Corporation, Maynard, Mass.

[21] Appl. No.: 229,845

[22] Filed: Apr. 15, 1994

Related U.S. Application Data

[60] Continuation of Ser. No. 33,053, Mar. 10, 1993, abandoned, which is a continuation of Ser. No. 827,473, Jan. 29, 1992, abandoned, which is a continuation of Ser. No. 555,776, Jul. 19, 1990, abandoned, which is a continuation of Ser. No. 384,832, Jul. 25, 1989, abandoned, which is a division of Ser. No. 93,811, Sep. 4, 1987, Pat. No. 4,885,770.

[51] Int. Cl.$^5$ ............... G06F 13/00; G06F 15/16
[52] U.S. Cl. ................... 395/700; 395/200; 364/DIG. 1; 364/280.2; 364/284.4; 364/222.2; 364/262.1; 364/975.2
[58] Field of Search ............... 395/200, 700

[56] References Cited

U.S. PATENT DOCUMENTS

| | | | |
|---|---|---|---|
| 4,095,054 | 6/1978 | Anizan et al. | 179/18 ES |
| 4,145,739 | 3/1979 | Dunning et al. | 364/200 |
| 4,197,427 | 4/1980 | Hutcheson et al. | 179/18 FC |
| 4,229,624 | 10/1980 | Haben et al. | 179/18 E |
| 4,320,455 | 3/1982 | Woods et al. | 364/200 |
| 4,335,426 | 6/1982 | Maxwell et al. | 364/DIG. 1 |
| 4,354,229 | 10/1982 | Davis et al. | 364/200 |
| 4,394,725 | 7/1983 | Bienvenu et al. | 364/200 |
| 4,404,628 | 9/1983 | Angelo | 364/200 |
| 4,447,874 | 5/1984 | Bradley et al. | 364/200 |
| 4,449,182 | 5/1984 | Rubinson et al. | 364/200 |
| 4,491,909 | 1/1985 | Shimizu | 364/200 |
| 4,538,224 | 8/1985 | Peterson | 364/200 |
| 4,543,627 | 9/1985 | Schwab | 364/200 |
| 4,546,430 | 10/1985 | Moore et al. | 364/200 |
| 4,567,562 | 1/1986 | Fassbender | 364/200 |
| 4,589,063 | 5/1986 | Shah et al. | 364/200 |
| 4,590,556 | 5/1986 | Berger et al. | 364/300 |
| 4,630,258 | 12/1986 | McMillen et al. | 370/60 |
| 4,633,039 | 12/1986 | Holden | 379/32 |
| 4,654,821 | 3/1987 | Lapp | 364/900 |
| 4,663,707 | 5/1987 | Dawson | 364/200 |
| 4,674,033 | 6/1987 | Miller | 364/200 |
| 4,675,865 | 6/1987 | DeVries et al. | 370/85 |
| 4,694,452 | 9/1987 | Beckinger et al. | 370/58 |
| 4,698,772 | 10/1987 | Carter et al. | 364/900 |
| 4,724,521 | 2/1988 | Carron et al. | 364/300 |
| 4,725,834 | 2/1988 | Chang et al. | 340/825.5 |
| 4,727,538 | 2/1988 | Furchtgott et al. | 370/85 |
| 4,752,870 | 6/1988 | Matsumura | 364/200 |
| 4,777,595 | 10/1988 | Strecker et al. | 364/200 |
| 4,783,730 | 11/1988 | Fischer | 364/200 |
| 4,807,111 | 2/1989 | Cohen et al. | 364/200 |
| 4,821,185 | 4/1989 | Esposito | 364/200 |
| 4,862,354 | 8/1989 | Fiacconi et al. | 364/200 |
| 4,896,289 | 1/1990 | Svinicki et al. | 364/900 |
| 4,914,570 | 4/1990 | Peacock | 364/200 |
| 4,914,576 | 4/1990 | Zelley et al. | 364/200 |
| 4,951,193 | 8/1990 | Muramatsu et al. | 364/200 |

OTHER PUBLICATIONS

Baer, *Computer Systems Architecture*, pp. 375-390 (Computer Science Press 1980).

*Primary Examiner*—Eddie P. Chan
*Attorney, Agent, or Firm*—Richard J. Paciulan; Denis G. Maloney

[57] ABSTRACT

A distributed digital data processing system including a host and at least one node interconnected by a communications link. In response to a boot command, the node requests its boot image from the host over the communications link. The host then provides pointers to portions of the boot image to the node. The node then retrieves the portions of the boot image identified by the pointers. These operations are repeated until node retrieves the entire boot image. By having the host supply pointers to the boot image and the node perform the retrieval operations in response to the pointers, the host is freed to perform other operations while the node is actually performing the retrieval operations.

6 Claims, 5 Drawing Sheets

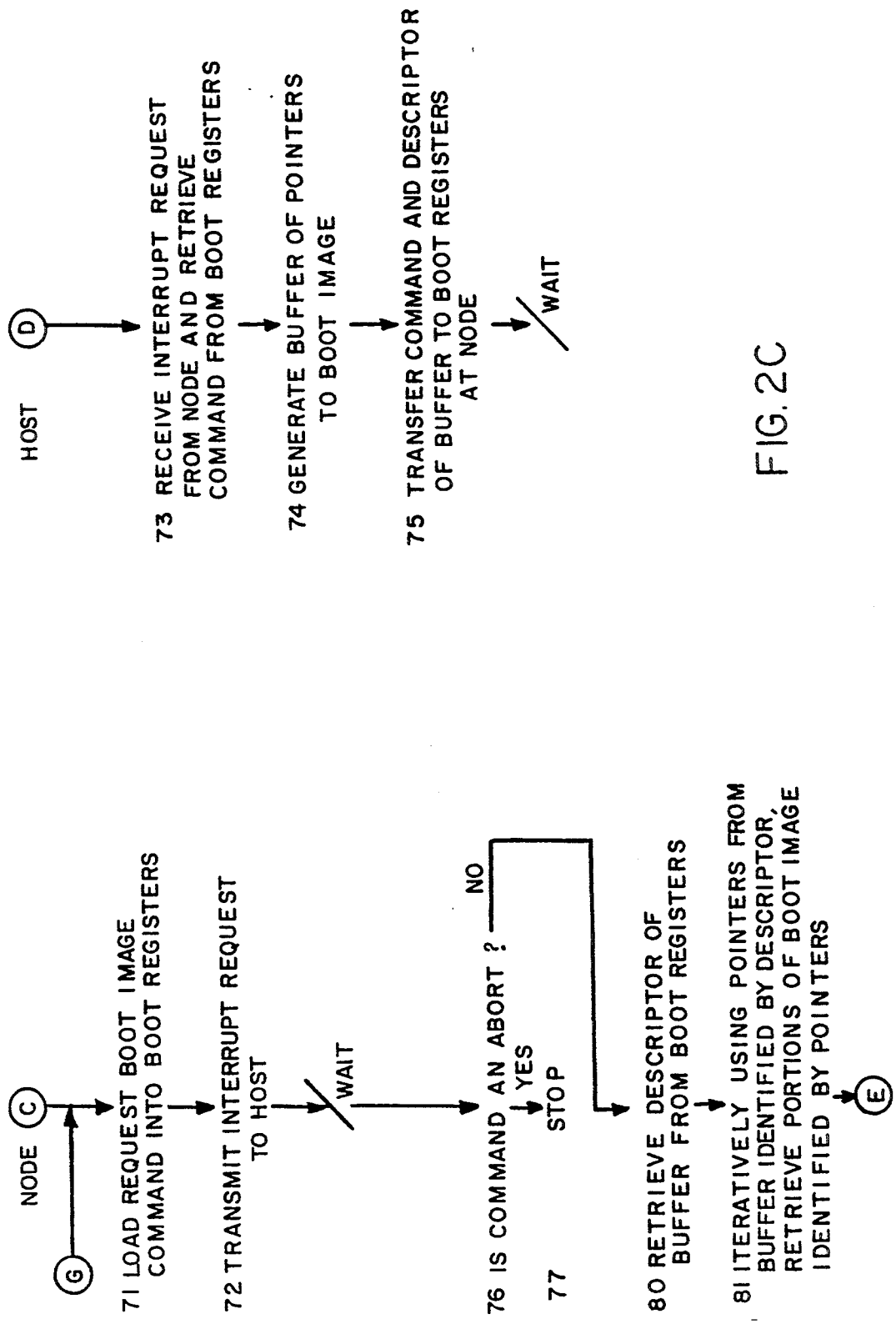

BOOT SYSTEM FOR DISTRIBUTED DIGITAL DATA PROCESSING SYSTEM

This is a continuation of application Ser. No. 08/033,053, filed Mar. 10, 1993, now abandoned, which is a continuation of application Ser. No. 07/827,473, filed Jan. 29, 1992, now abandoned, which is a continuation of application Ser. No. 07/555,776, filed Jul. 19, 1990, now abandoned, which is a continuation of application Ser. No. 07/384,832, filed Jul. 25, 1989, now abandoned, which is a divisional of application Ser. No. 07/093,811, filed Sep. 4, 1987, which is now U.S. Pat. No. 4,885,770.

BACKGROUND OF THE INVENTION

1. Field of the Invention

The invention relates generally to the field of digital data processing systems, and more specifically to an apparatus and method for enabling booting of an intelligent node connected to a host system.

2. Description of the Prior Art

In the past, digital data processing systems, or computers, were large and expensive systems including one or only a few central processor units connected to a main memory, mass storage such as disk and tape units, and input/output units such as printers, video display terminals, and telecommunications links. Because of the cost of such systems, they typically supported a number of users, and a significant amount of design effort went into making them faster. However, as more parts of the computers were put onto integrated circuit chips, including entire central processor units, the cost of computers declined dramatically, and so it became cost effective in many applications to devote a single computer to one or only a few users.

A benefit of having all users using a single large computer system is that data and programs may be shared among a number of users. This benefit can also be realized in an environment of smaller computers if they are linked together, for example, to form a distributed system. In a distributed system, the system is controlled by a host computer which provides services to the smaller computers, which are termed "nodes", such as data and program sharing, scheduling of resources such as printers and the like. In addition, the host assists the nodes in booting, that is, in obtaining the node's operating system programs when it (the node) initially begins operating. The operating system programs are programs which are used to control the node, including transfers to other devices in the distributed system.

Typically, when a node is initially powered up, the host senses the node being powered up and begins transferring to the node the copy of the operating system programs, that is, the "boot image", which the node will thereafter use. This is essentially a file transfer operation. However, since the node operates essentially only as a receiver, the host must perform all of the management of the transfer, decreasing its ability to do other processing work until the boot image is completely transferred.

SUMMARY OF THE INVENTION

The invention provides a new and improved apparatus and method for performing a transfer of a boot image from a host to a node in a distributed digital data processing system.

In brief summary the distributed digital data processing system includes a host and at least one node interconnected by a communications link. In response to a boot command, the node requests its boot image from the host over the communications link. The host then provides pointers to portions of the boot image to the node. The node then retrieves the portions of the boot image identified by the pointers. These operations are repeated until node retrieves the entire boot image. By having the host supply pointers to the boot image and the node perform the retrieval operations in response to the pointers, the host is freed to perform other operations while the node is actually performing the retrieval operations.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 2A through 2D comprise a flow diagram useful in understanding the boot operation performed by the system depicted in FIG. 1.

DETAILED DESCRIPTION OF AN ILLUSTRATIVE EMBODIMENT

Figure 1:
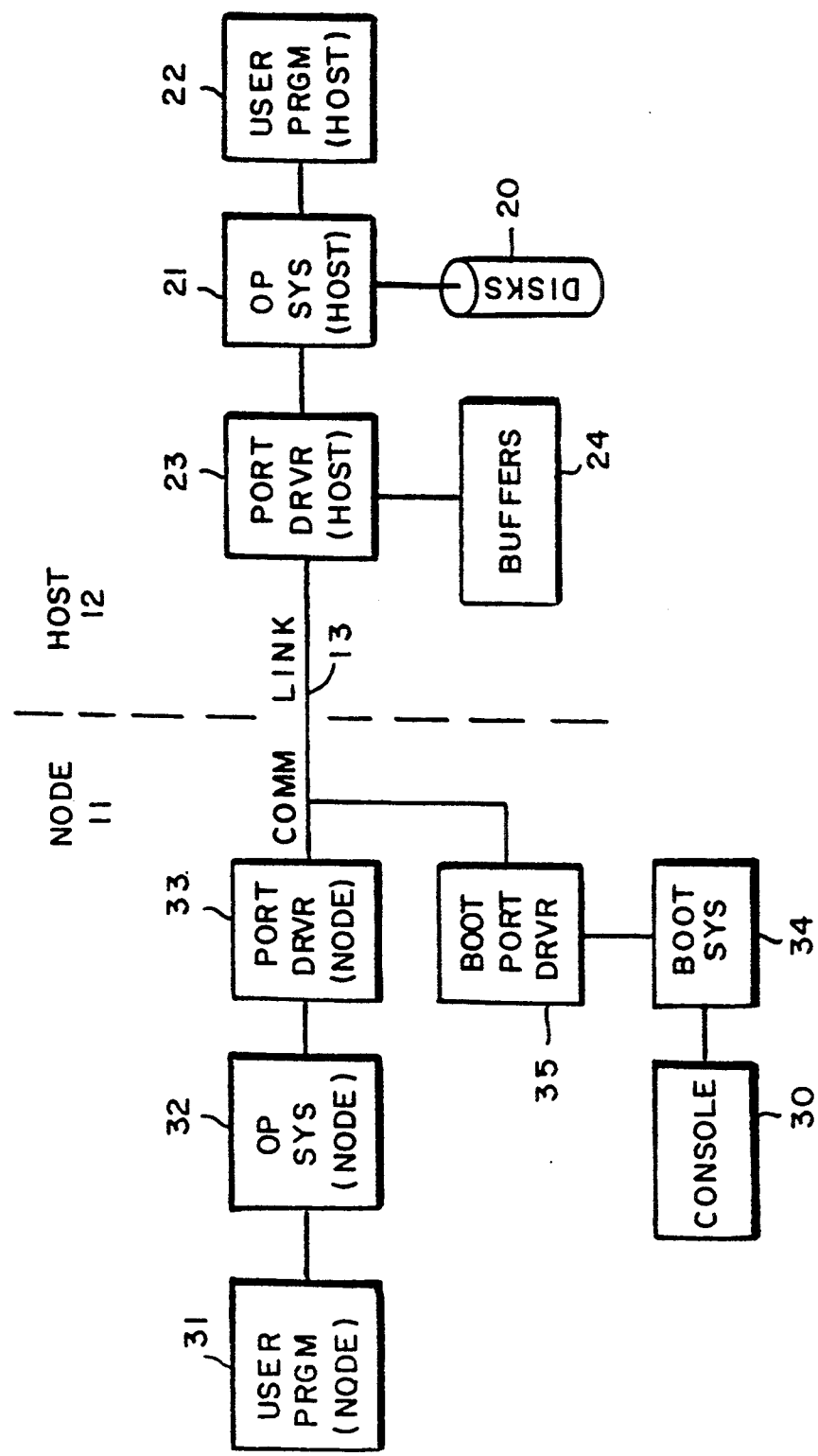
FIG. 1 is a block diagram of a distributed computer system constructed in accordance with the invention.

FIG. 1 depicts a distributed computer system constructed in accordance with the invention. With reference to FIG. 1, the system includes a node 11 and a host 12 which communicate over a communications link 13. The distributed system may also include additional nodes which also communicate with the host 12 over communications link 13 or over additional communications links (not shown). As is typical, the host 12 is a computer system including a central processor unit, memory, and one or more input/output units such as printers, video display terminals and disk and tape storage units operating under control of an operator at a console; since these elements are conventional they are not shown in the Fig., except for a disk storage unit 20. The computer system forming host 12 runs programs which are depicted in the Fig.

In particular, the computer system forming host 12 operates under control of a host operating system 21. The host operating system 21 performs services for one or more host user programs 22, including program scheduling, accessing input/output units such as disk storage unit 20, and enabling information to be transferred over communications link 13 through a host port driver 23. The host port driver generally transfers information to and from buffers, such as buffers 24, which may be loaded by the host operating system 21, in the case of information to be transferred by the host 12 over communications link 13, or used by the host operating system 21, in the case of information received by the host 12 over communications link 13.

As is also conventional, the node 11 also comprises a computer system including a central processor unit, memory, and may include one or more input/output units, operating under control of console instructions from a console 30. The node 11 also runs programs which are depicted in the Fig. Under normal operation, the node 11 processes node user programs 31, a node operating system 32 and a node port driver 33 which are analogous to the host user programs 22, host operating system 21 and host port driver 23 in host. The node 11 also includes a boot system 34 and a boot port driver 35 which, under control of the console 30, enable the node 11 to boot, that is, to obtain from the host 11 an image of the node user program 31, node operating system 32 and node port driver 33. This may be done when the node 11 is first powered up, and also when commanded to by the console. The boot system 34 and boot port driver 35, after obtaining at least the image of the node operating system 32 and node port driver 33, transfers control thereto to enable normal operation at the node. If necessary, the node operating system 32 and node port driver 33 may thereafter obtain an image of the node user program from the host 12.

Figure 2A:
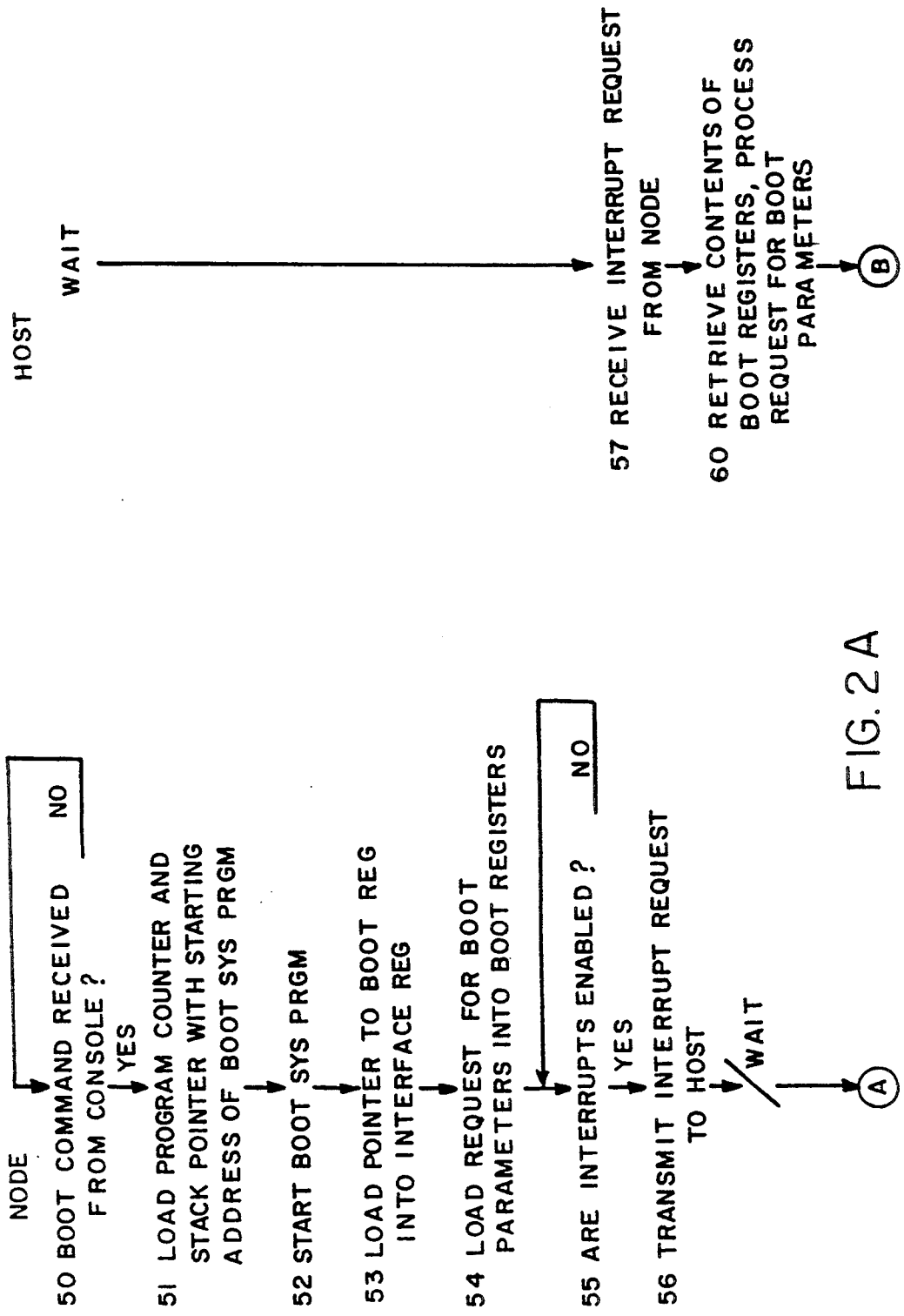
Figure 2B:
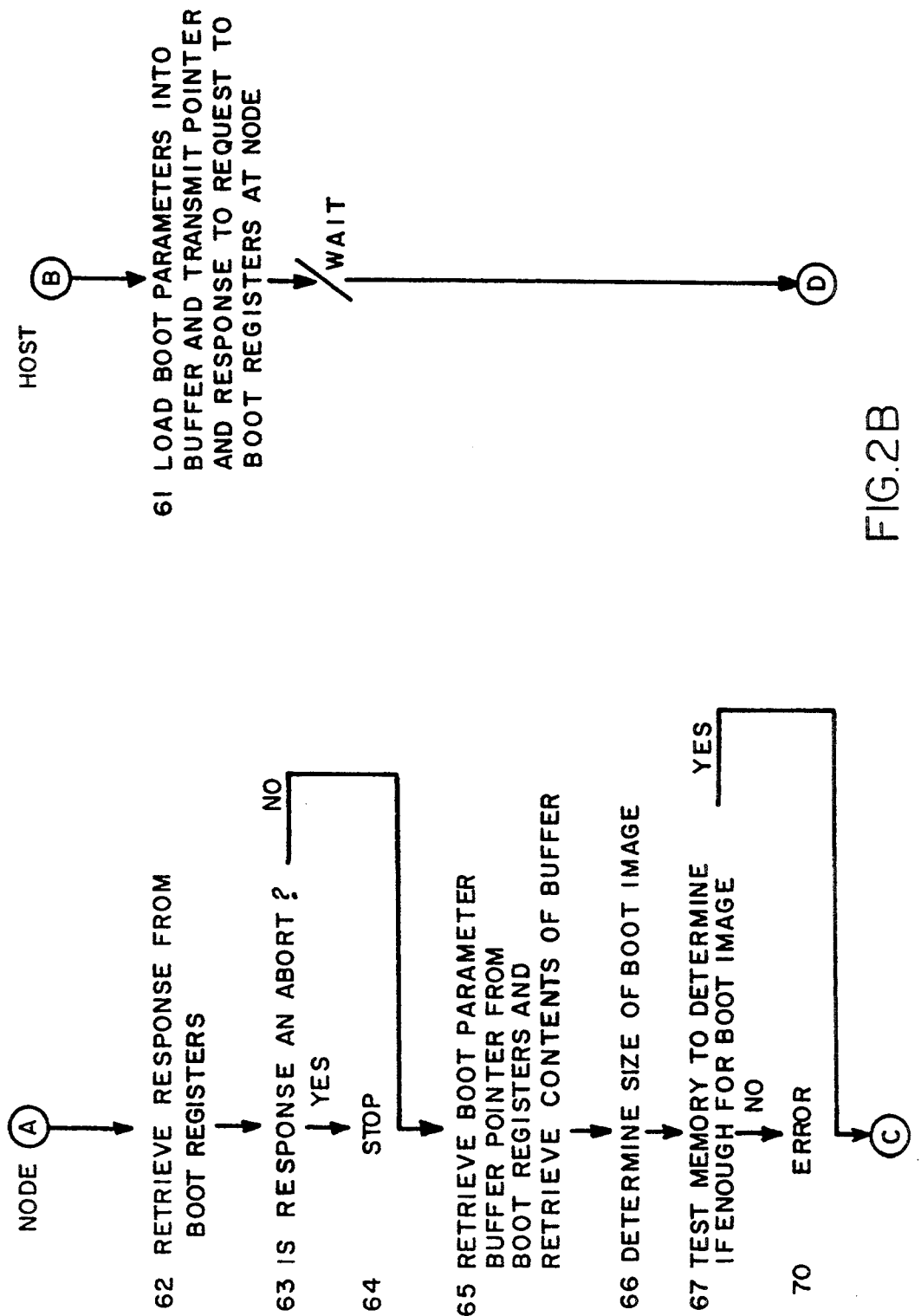
Figure 2D:
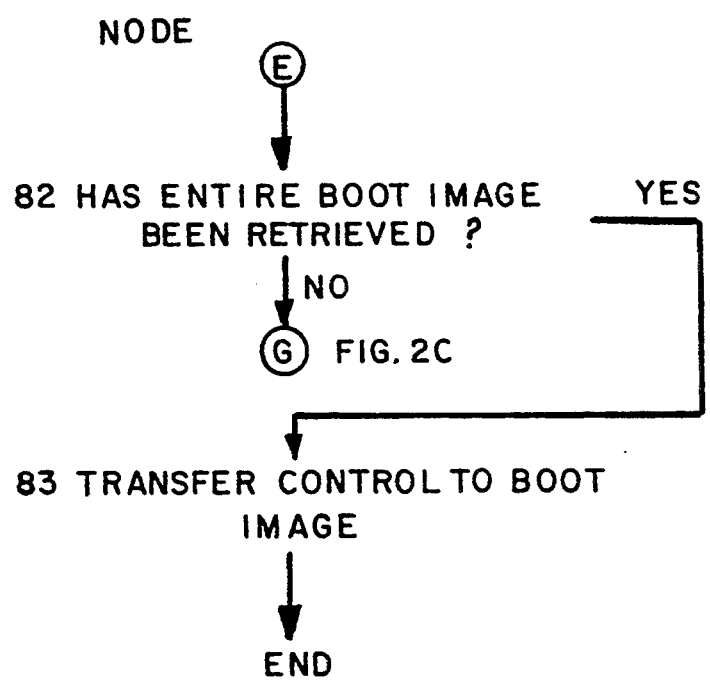

FIGS. 2A through 2D detail the sequence performed by node 11 and host 12 in performing the boot procedure in accordance with the invention. With reference to FIG. 2A, upon receipt of a boot command from the host port driver 23, the console 30 (step 50) loads the node's program counter and stack pointer registers, which are conventional and not shown in FIG. 1, with starting addresses of the program comprising the boot system 34 (step 51). In one embodiment, the boot command includes a node number upon which the addresses loaded in the program counter and stack pointer are based. The boot system 34 then starts (step 52), which, in turn, starts the boot port driver 35.

Immediately upon starting, the boot port driver loads a pointer to a set of boot registers into a selected interface register (step 53). By way of background, in one embodiment, the node 11 includes a set of interface registers (not shown) which may be accessed by programs at the node 11 and also by the host 12. The interface registers allow the node 11 and host 12 to communicate. One of the interface registers is selected to be a default register which is accessed in the absence of previous identification of interface registers to be accessed, and so the boot port driver 35 loads the boot registers pointer into that default register. The boot registers also comprise selected sequential ones of the interface registers, and the pointer loaded into the default identifies the location of one of them in the interface registers; since the boot registers are sequential in the interface registers, the locations of the others are inferred from the pointer.

After loading the boot registers pointer in the default interface register (step 53), the boot port driver 35 loads a command into the boot registers requesting the host 12 to provide boot parameters (step 54). In one embodiment, the boot parameters define the size of the boot image which the node 11 is to receive from the host 12, a node address and a node name. If the node 11 is enabled to interrupt the host 12 (step 55), the boot port driver 35 then transmits an interrupt request to the host 12 over communications link 13 (step 56). An interrupt flag in the interface registers, which is controlled by the host 12, when set enables the node 11 to interrupt the host 12, or if reset disables the node 11 from interrupting the host 12. If the interrupt flag is reset, the boot port driver waits unit it is set before transmitting the interrupt request. After transmitting the interrupt request, the node 11 waits until it receives a response from the host 12.

After receiving the interrupt request from the node 11 over communications link 13 (step 57), the host 12 retrieves the contents of the boot registers over communications link 13 and processes the request for boot parameters (step 60). Specifically, the host port driver 23 {FIG. 1) retrieves the contents of the default interface register at the node 11 over communications link 13 to determine the location of the registers whose contents are to be used in processing the interrupt request. The default interface register at this point contains the pointer to the boot registers. The host port driver 23 thus uses the pointer to retrieve over communications link 13 the contents of the boot registers, which contain the request for the boot parameters. The host port driver 23 passes the command to the host operating system, which establishes a buffer in buffers 24 for the boot parameters, and passes a response and a pointer to the buffer containing the boot parameters, to the host port driver 23. The host port driver 23 then passes the response and boot parameter buffer pointer over communications link 13 to the boot registers (step 61).

The boot port driver 35 monitors the boot registers to determine if their contents have been changed. If the contents of the boot registers have been .changed, the boot port driver 35 determines that a response from the host 12 has been received. After the host 11 loads the response and boot parameter buffer pointer into the interface registers in step 61, the boot port driver 35 first retrieves the response (step 62, FIG. 2B) and determines if the response is an abort command (step 63). If the response is an abort command, the node 11 halts (step 64). On the other hand, if the response retrieved in step 62 is not an abort command, the boot port driver 35 sequences to step 65, in which it retrieves the boot parameter buffer pointer from the buffer registers and retrieves the contents of the buffer identified by the pointer, thereby retrieving the boot parameters.

Initially upon receiving the boot parameters, the boot port driver 35 passes them to the boot system 34, which determines the size of the required boot image (step 66) and tests the memory of node 11 to verify that there is enough memory for the boot image (step 67). If node 11 does not have enough memory for the boot image, the boot system 34 signals an error to the console 30 and the node 11 halts (step 70).

If, on the other hand, boot system 34 determines in step 67 that the node 11 has enough memory for the boot image, the boot system 34 enables the boot port driver 35 to load a command into the boot registers requesting the boot image (step 71). The boot system 34 also indicates the size of the expected boot image to the boot port driver 35. If the interrupt flag of node 11 is set, indicating interrupts are enabled, the boot port driver 35 then transmits an interrupt request over communications link 13 to the host 12 (step 72).

Upon receiving the interrupt request from node 11, the host 12, and specifically the host port driver 23, again retrieves over communications link 13 the contents of the default register in the interface registers of node 11. Since the default register still points to the boot registers, the host port driver 23 retrieves over communications link 13 the contents of the boot registers, including the command requesting the boot image (step 73). The host port driver 23 passes the command to the host operating system 21, which loads a buffer in buffers 24 with pointers to the boot image. In one specific embodiment, in which the memory of host 12 is paged, the buffer generated by the host operating system 21 contains pointers to the sequential pages of the boot image. The host port driver 23 then transfers over communications link 13 a response and a descriptor of the buffer to the node 11, specifically to the boot registers. The buffer descriptor contains a pointer to the buffer in buffers 24 and a value corresponding to the buffer's length.

Upon receipt of the response from the host 12 over communications link 13, the boot port driver 35 retrieves the response and determines whether it is an abort command (step 76). If the response is an abort command, the node 11 halts (step 77). On the other hand, if the response is not a halt command, the boot port driver 35 retrieves from the boot registers the descriptor of the buffer in buffers 24 containing the pointers to the boot image (step 80). The boot port driver 35 then determines, based on the length information in the descriptor and the boot image length information which it received from the boot system 34, whether the buffer contains pointers to the entire boot image or only a portion of it. In addition, the boot port driver determines the amount of boot image remaining after the portion identified by the buffer has been retrieved if the buffer contains pointers to only a portion of the boot image.

The boot port driver then iteratively retrieves over communications link 13 the portions of the boot image identified by the pointers in the buffers and loads them into the memory at the node 11 (step 81). In doing so, it may either retrieve the entire buffer identified by the buffer descriptor supplied by the host in step 75 and then use the pointers the buffer in the retrieval of the portions of the boot image identified thereby, or it may iteratively retrieve each of the pointers from the buffer and, after retrieving each pointer, retrieve the portion of the boot image identified thereby. In either case, after the portions of the boot image identified by the pointers has been retrieved, the boot port driver 35 determines whether the entire boot image has been retrieved (step 82, FIG. 2D), and, if not, returns to step 71 to initiate the retrieval of additional portions of the boot image.

The procedure depicted in steps 71-77 and 80-82 is iteratively repeated until the boot port driver 35 determines that the entire boot image has been retrieved. In any iteration, the node 11 may, in response to a request in steps 71 and 72 for additional portions of the boot image, receive an abort response from the host 12, in which case the node 11 halts (step 77). Assuming that node 11 is not halted before it has retrieved the entire boot image, following step 82 (FIG. 2D), the boot port driver 35 notifies the boot system 34 that the boot image has been retrieved. At that point, the boot system 34 enables the boot port driver 35 to transmit, through the boot registers, a command to host 12 indicating successful receipt of the boot image. The boot system 34 thereafter transfers control to the boot image (step 83), which constitutes at least the node operating system 32 and node port driver 33. If the boot image does not include the node user program 31, the node operating system 32 may, through node port driver 33, enable retrieval of the node user program 31 from the host 12 in a conventional manner.

It will be appreciated that the boot system provides several advantages. In particular, since the node 11 iteratively initiates retrieval of the sequential portions of the boot image, the pace of retrieval is controlled by node 11. Thus, nodes may be used in the system depicted in FIG. 1 having different retrieval rates. In addition, since the node 11 effectively controls the retrieval of the individual portions of the boot image, it may determine when any errors occur in the retrieval operation and perform any required recovery operations. Furthermore, since the boot image retrieval is under control of the node 11, the host 12 may be free to do other processing except in response to the specific interrupts from the node 11. The host is free to respond to the requests from other nodes while the node 11 which is in the process of booting is actually retrieving it boot image.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. In a distributed digital processing system comprising a host and associated storage disposed at a first location, and at least one computer node and associated memory disposed at a second location remote from the first location, said host and said at least one computer node being coupled together by at least one communications link of a network that is disposed between said first location and said second location a method of booting said node, comprising the steps of:
   A. said host sending a boot command over said communications link to said node when said node is in a preoperational state in which said node is not prepared to respond to instructions from a user to perform data processing operations;
   B. said node sending an initiate boot image transfer request over said communications link to said host in response to said boot command;
   C. performing a boot retrieval operation in response to receipt by said host of said initiate boot image transfer request, said boot retrieval operation being initiated by said host and including the steps of:
      i. said host identifying portions of an executable boot image in said storage and generating boot image pointer information to said boot image and a response to said node, said boot image pointer information comprising a plurality of pointers to said portions; and
      ii. said node, upon receipt of said response from said host, transferring the generated boot image pointer information from said first location to said second location via said communications link, said node using said pointers to iteratively initiate retrieval of said boot image portions from said storage of said host and for controlling the rate of said iterative retrieval, and said node storing the transferred boot image portions in the memory of said node;
   D. said host performing other operations while said node iteratively retrieves said boot image portions from said storage of said host; and
   E. said node executing the retrieved entire boot image to place itself in an operational condition in which said node is prepared to respond to instructions from the user to perform data processing operations.

2. A method as in claim 1 wherein said step of sending said initiate boot image transfer request includes the steps of:
   A. said node transmitting a boot parameter request over said communications link to said host;
   B. said host generating boot parameter information, including boot image size information, in response to said boot parameter request;

C. said node receiving said boot parameter information from said host over said communications link; and D. said node sending a request for said boot image pointer information in response to receiving said boot parameter information, said sending said request for said boot image pointer information being dependent on said boot parameter information.

3. A method as in claim 2, wherein said step of sending a request for the boot image pointer information by said node includes the steps of:

A. determining from said boot image size information whether the size of said memory is sufficient to store said boot image;

B. sending a request for said boot image pointer information over said communications link if said memory size exceeds the boot image size; and C. entering a halted state if said memory size is less than said boot image size, said node failing to retrieve said executable boot image when in said halted state.

4. A method as in claim 2 wherein said node further comprises a plurality of boot registers and a default register, wherein said step of said node transmitting said boot parameter request further includes the steps of:

A. loading a pointer to said boot registers into said default register, said pointer identifying locations of said plurality of boot registers;

B. storing said boot parameter request in said boot registers using said pointer; and C. transmitting an interrupt request after said boot parameter request has been stored in said boot registers to indicate that said boot parameter request has been stored.

5. A method as in claim 1 wherein said step of using said pointers to iteratively retrieve said boot image portions includes retrieving a portion of said boot image identified by one of said pointers before using another one of said pointers.

6. A method as in claim 1 wherein said step of using said pointers to iteratively retrieve said boot image portions includes retrieving all of said pointers into said memory from said host before iteratively retrieving said boot image portions identified by said pointers.

* * * * *